United States Patent [19]

Imris

[11] 4,062,748

[45] Dec. 13, 1977

[54] METHOD AND APPARATUS FOR PRODUCING OZONE

[76] Inventor: Pavel Imris, 5287-5 Rivendell, Columbia, Md. 20144

[21] Appl. No.: 717,190

[22] Filed: Aug. 24, 1976

[30] Foreign Application Priority Data

Sept. 6, 1975 Germany ............................ 2539715

[51] Int. Cl.² ....................... C01B 13/10; C01B 13/11
[52] U.S. Cl. .................................. 204/176; 204/177; 250/532
[58] Field of Search ................. 204/176; 250/532–541

[56] References Cited

U.S. PATENT DOCUMENTS

| 607,007 | 7/1898 | Andreoli | 250/532 |
| 636,304 | 11/1899 | Vosmaer | 250/532 |

Primary Examiner—Howard S. Williams
Assistant Examiner—Aaron Weisstuch
Attorney, Agent, or Firm—Bauer, Amer & King

[57] ABSTRACT

Apparatus for producing ozone, wherein air or oxygen is passed through two high voltage electrodes mounted opposite each other in a housing and is converted into ozone by electrical discharge. The housing is constructed as a slender tube open at both ends and made from an electrically non-conductive material, while between the two electrodes, extending more or less over the entire inner length of the tube is mounted at least one bipolar electrode without an electrical input or output, which divides the inside of the tube into discharge channels. The bipolar electrode is formed by a surface, on which discharge points are mounted and directed at the earthed electrode. The discharge electrode, directed at the surface of the bipolar electrode, is similarly provided with a plurality of discharge points.

22 Claims, 8 Drawing Figures

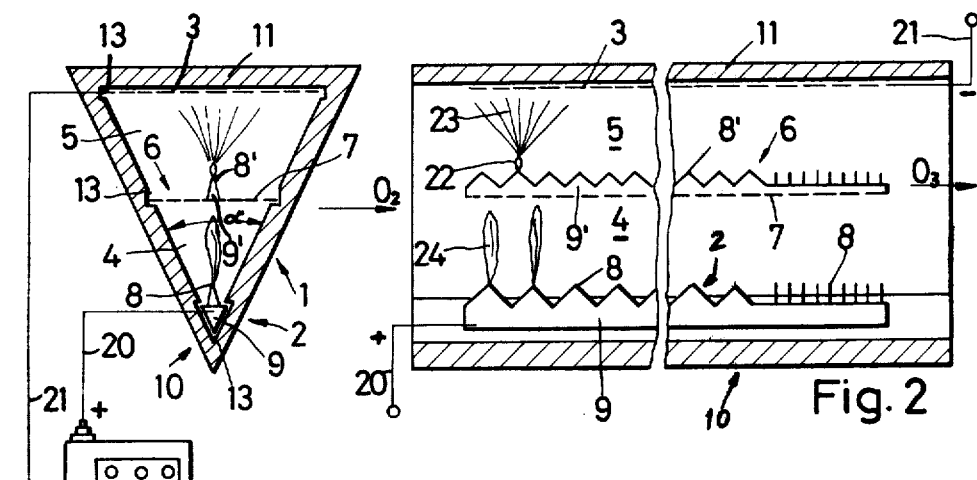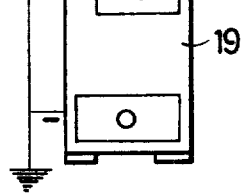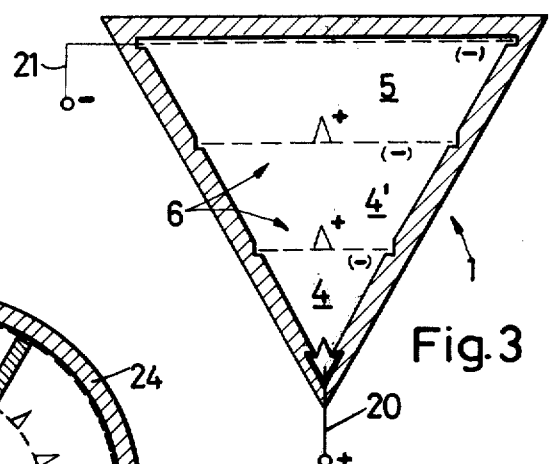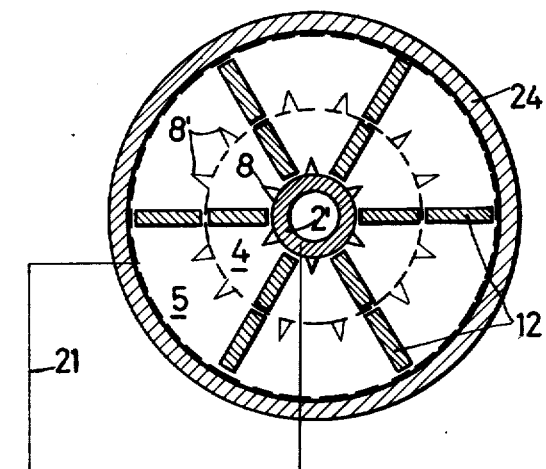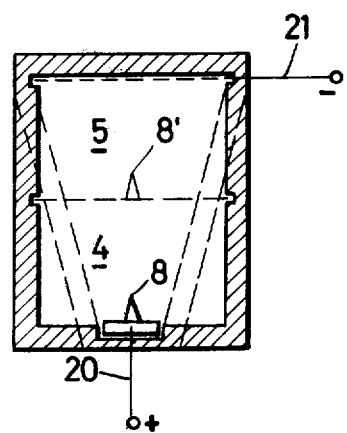

METHOD AND APPARATUS FOR PRODUCING OZONE

BACKGROUND OF THE INVENTION

The invention relates to an apparatus for producing ozone, wherein air or oxygen is passed through two high voltage electrodes located opposite each other in a housing and is converted into ozone by electrical discharge.

Apparatus for producing ozone are known. The oxygen molecule may be split by supplying thermal energy. However, this method produces only a low ozone yield, since elevated temperature simultaneously promotes the endothermic decomposition of the ozone. Thus, even at 2000° C only about 1% by volume of ozone is in oxygen equilibrium, of which only about 1/10 % remains on rapid cooling, since the endothermic overall decomposition of the ozone continues as the temperature falls.

Therefore, it is more appropriate to produce the oxygen atoms at a low temperature by supplying electrical, optical or chemical energy and then allow them to react further, since at low temperatures the decomposition equilibrium is only created extremely slowly in the absence of catalysts, with the result that the ozone once formed is retained as a metastable compound. The supply of electrical energy may take place, for example, in a so-called "Siemens Ozoniser," which consists fundamentally of two glass tubes placed one inside the other, the outer or inner wall of which is water cooled and connected conductively to the ends of an induction coil. In the narrow annular space between the glass tubes, electrical discharges occur when voltage is applied, through which a dry oxygen or air current is passed. The mixture leaving the ozonizer has a 15% ozone content at best.

The possible range of uses for ozone has therefore not hitherto been used to the full, because the costs of ozone production are too high. Present-day methods of manufacturing ozone require too much expensive energy, and with the known ozonizers only 5 to 15% of the electrical energy is used for producing ozone, whilst the remaining energy is converted into heat.

The best known method of producing ozone up till now is that of electrical discharge in air or oxygen. This discharge takes place in the gap between two insulated electrodes to which an alternating current is applied. In the first period, positive ions accumulate on the surface of one electrode and negative ions on the opposite insulator, these then being discharged in the second period. These ozonizers known at present cannot be operated with direct current, since direct current cannot pass through the insulators. DC ozonizers are indeed also known, but have hitherto been of importance only for scientific purposes. They have not been used industrially, although it was plain that DC corona ozonizers are simpler and more economical to construct and operate.

An improvement on this is provided by an ozonizer according to U.S. Pat. No. 3,842,286 which already ensures a substantial increase in the ozone yield, but in order to produce the corona it requires two electrical fields, a high voltage of about 60,000 volts with correspondingly high demands on the construction material and, finally, a dryer for the gaseous medium which is to be reacted must be provided, since the ozone yield decreases appreciably as the moisture level increases.

SUMMARY OF THE INVENTION

Therefore, the invention is based on the problem of eliminating these disadvantages. It is the object of the invention to provide an apparatus which substantially further improves the ozone yield with regard to total energy consumption and wherein preliminary drying and optional cooling are no longer necessary.

This problem is solved according to the invention with an apparatus of the kind described hereinbefore by constructing the housing as a slender tube open at both ends and made from electrically non-conductive material such as rigid PVC or the like, whilst there is mounted, between the two opposite electrodes extending more or less over the entire internal length of the tube, at least one bipolar electrode with no electrical input or output, which divides the inside of the tube into discharge channels, and which is formed by a surface, such as a grid, a perforated metal sheet or the like, and discharge points arranged on it and directed at the earthed electrode, whilst the discharge electrode is directed at the surface of the bipolar electrode, and is also provided with a plurality of discharge points arranged thereon.

This apparatus according to the invention is not only substantially simpler in construction — apart from the fact that cooling and drying devices which would otherwise have to be provided are unnecessary — but also produces a substantially higher ozone yield and does not require pre-drying of the air.

Therefore, on the basis of the good yield obtainable, ozone can be used more favorably as a strong oxidizing agent in the following fields, for example, to a greater extent than up till now: treatment of drinking water, industrial water purification, improvement of air, medicine, chemistry, food storage, etc.

With regard to previous ozone production, it was found that, in the case of silent discharge, ozone is formed substantially only in that part of the discharge which shines with a blue-violet arc. However, this arc is only 2 to 3 mm long, compared with an overall discharge path of 35 mm, for example. The special construction of the apparatus ensures that this arc is substantially enlarged, namely to a length of about 12 to 25 mm. As already mentioned, no drying or cooling is required. A dielectric, as in the apparatus according to German Pat. No. 2,165,249, is no longer necessary and the apparatus uses a DC source with only about 15,000 to 30,000 volts. As for the construction of the apparatus, it can be built from inexpensive material or rigid PVC, apart from a small part (electrodes) made of stainless steel, for example.

The absolute pressure of the gas supply to the apparatus may be substantially higher than in known systems, and this is also advantageous, since, despite the possible higher pressure, the apparatus according to the invention produces about 1,000 times less nitrous gases than do AC ozonizers. The ozone yield or ozone concentration by volume obtainable with the apparatus according to the invention is about twice as great as in known ozonizers and this is achieved without pre-drying and cooling the media fed in.

Since the apparatus does not require dryers and coolers, it takes up substantially less space, on the other hand, and moreover can be installed nearer the place of use of the ozone.

With regard to the improved ozone yield obtainable, it can only be assumed that, owing to the division of the tube into chambers, by means of the bipolar electrode, to some extent there is formed, around the discharge electrode, a pressure chamber wherein the ions produced, which can no longer directly reach the attached counterelectrode, compress the flame or the arc. However, the narrower, longer arc appears to provide the ozone molecules produced with a better chance of passing through the area of activity of the arc unaffected, i.e., the partial decomposition of the ozone molecule which would otherwise be unavoidable is obviously reduced, so that an overall higher zone yield is obtainable in this area. In the upper part of the apparatus tube, i.e., above the electrode here termed a bipolar electrode but having no electrical connections of any kind, ozone production proceeds normally and as usual, i.e., once again simultaneous decomposition of the ozone molecules produced occurs during production. The intermediate element which divides up the tube is termed a bipolar electrode because it has different charge characteristics on the points and on the other surface which faces the discharge electrode.

BRIEF DESCRIPTION OF THE DRAWINGS

For a better understanding of the invention the apparatus for producing ozone is hereinafter explained in more detail with reference to the drawings of exemplary embodiments, wherein are shown, diagrammatically, FIG. 1 partly in section and in plan view, a simple embodiment of the apparatus;

FIG. 2 a longitudinal section through the tube in the apparatus according to FIG. 1;

FIG. 3 a section through the tube similar to that in FIG. 1, in another embodiment;

FIG. 4 another embodiment of the apparatus with the discharge channels arranged concentrically;

FIG. 5 in section, another possible embodiment of the tube;

FIG. 8 a diagram with the ozone yield per KWh over the dew point temperature of the media fed in.

DESCRIPTION OF THE REFERRED EMBODIMENTS

Figures 6, 7:
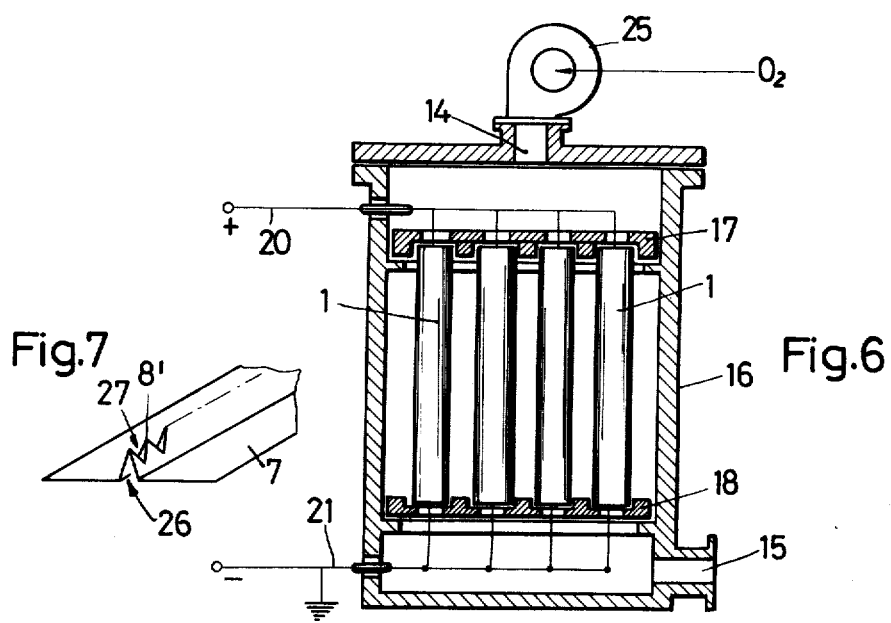
FIG. 6 in section, the arrangement of several discharge or production tubes in a common housing.
FIG. 7 in perspective, a special embodiment of the bipolar electrodes.

In the figures, reference numeral 1 denotes the housing, preferably made of rigid PVC, containing the discharge channels 4, 5, reference numeral 2 the discharge electrode, reference numeral 3 the earthed counterelectrode arranged opposite it, reference numeral 6 the bipolar free from electrical connections, reference numeral 7 the surface thereof in the form of a grid, reference numerals 8 and 8', respectively, the points of the electrodes 2, 6, reference numerals 9, 9' the strips of the electrodes 2, 6 carrying the points, these strips preferably being made from fine steel, reference numeral 10 the narrow side of the housing and reference numeral 11 the wide side thereof. 19 is a suitable DC high voltage generator connected to the electrodes 2, 3 via leads 20, 21.

From FIG. 2, it is seen that the electrode strips 9, 9' and the electrode 3, preferably also grid-like in construction, are rather shorter than the length of the tubular housing 1. This is provided particularly for cases wherein several tubes or housings 1 are arranged in close concentration, so that no arcing can take place in the region of connection of the leads 20, 21.

According to FIG. 3, several bipolar electrodes 6 may also be included, thus to some extent producing a discharge cascade.

As can be seen from FIG. 2, relatively long, narrow arcs 24 are produced in the discharge channel 4 at the points 8, whereas in the discharge channel 5 at the electrode points 8' normal discharge occurs with a short blue-violet arc 22 which leads only to a normal and hitherto customary ozone yield, whilst in the spread 23 of the radiating electrons shown, the probability of decomposition or destruction of the ozone molecule formed is far greater than in the region of the slender arc flames 24 at the points 8. The air or oxygen enter the tube on the left, having been neither especially cooled nor dried, and on the right the ozone formed is drawn out or blown out.

At about 20,000 volts, corona discharge starts at the point 8 in the discharge channel 4, whilst, after a further increase in voltage, the long slender arcs 24 are produced, whilst at the points 8' in the discharge channel 5 silent discharge occurs, leading to an ozone yield which is about five times smaller.

The surface 7 of the bipolar electrode 6 may be formed by a metal plate which may be perforated, or preferably it may be of grid-shaped construction. The strip 9' is fixed vertically on the surface 7, by spot welding, for example, whilst the strip 9 is inserted in a suitable shaped groove 13 in the housing. For fixing the surface 7 and the electrode 3, for which preferably a metal grid is again used, grooves 13 are also provided at corresponding points on the walls of the housing. The points 8 or 8' may be shaped like saw teeth or, as indicated in FIG. 2, they may be needle-shaped.

For manufacturing reasons, it is particularly advantageous if the points 8' are produced uniformly with the surface 7 so that the surface 7 is provided with at least one surface fold 26 as in FIG. 7, whilst openings 27 are provided in the region of the surface fold 26.

Advantageously, the positive polarity is applied to the electrode 2, since this gives the best ozone yield; however, the negative polarity can also be applied thereto.

The spacing between the points 8 or 8' and the bipolar electrode 6 or the electrode 3 is preferably about 25 mm. The aperture angle (FIG. 1) of the housing measures about 60°.

Tubes as in FIGS. 1 to 3 can readily be bundled together as individual tubes in a circular formation (not shown) or the discharge channels 4, 5 may also be constructed, as in FIG. 4, concentrically in an outer tube 24 with radial partition walls 12. If the electrode 2 is formed by a metal tube, as shown, this tube is sealed at its ends.

The triangular form shown is indeed advantageous but not absolutely essential. Apparatus of tubular cross sections shaped as in FIG. 5 may also readily be used, and so may a trapezoidal shape (shown in dotted lines in FIG. 5). The principle of the construction and function is not changed thereby.

According to FIG. 6, several individual tubes or grouped arrangements as in FIG. 4 may be mounted in a housing 16 between clamping members 17, 18, whilst the gaseous medium is blown in by a blower 25. The ozone formed flows through connection 15 to the place of consumption.

Figure 8:
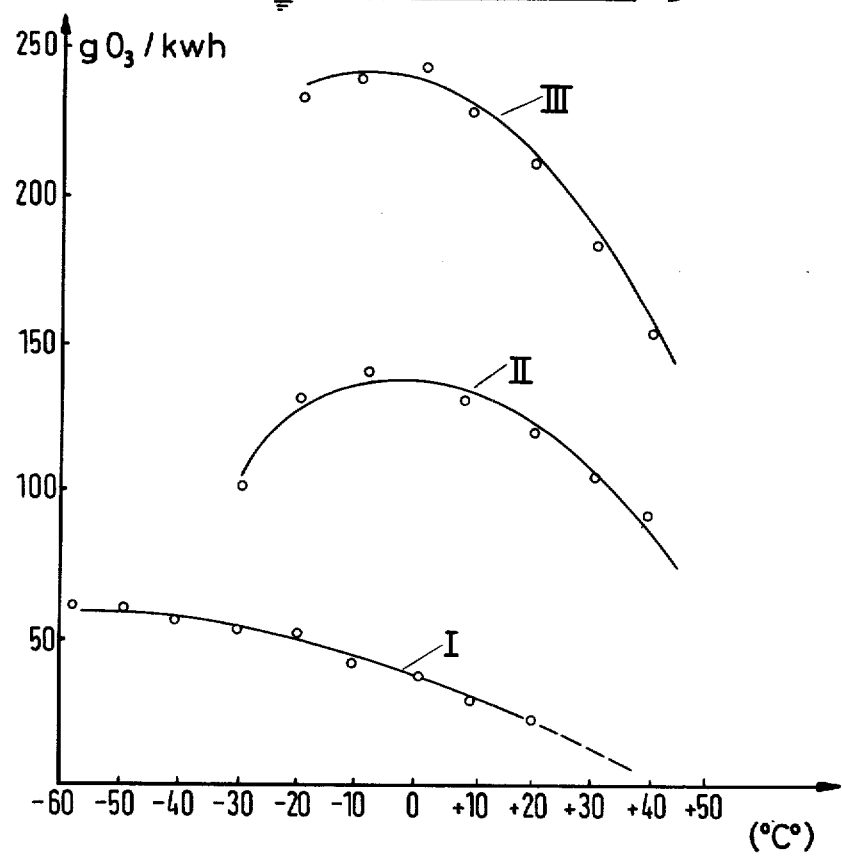

FIG. 8 is a diagram which shows the ozone production capacity per Kwh depending on absolute moisture in the air, which is defined by the dew point temperature in ° C. Curve I shows the ozone production capacity of known AC ozonizers with a supply of air. This curve shows that, at a dew point temperature of +20° C, the ozonizers produce only about 20 g of $O_3$ per Kwh. Curves II and III, on the other hand, show the ozone production capacity of the apparatus described. With a dew point temperature of 0° C, this capacity is higher if the gas supplied is air. Curve III shows the capacity when the gas supply consists of a mixture of 90% oxygen and 10% nitrogen. All three curves show that the ozone yield is dependent on humidity. The essential advantage of the apparatus described consists in the fact that this ozonizer produces two to three times more ozone per Kwh than the known ozonizers, at a higher humidity level, which means that the apparatus described requires absolutely no expensive air dryers, unlike the known systems.

The accompanying Table shows some other advantages: for example, the absolute pressure of the gas to be introduced may be much higher than with known ozonizers. In the case of known ozonizers, nitrous gas is produced at higher pressures, but in the apparatus described it is produced in amounts about 1,000 times smaller.

Other results include the electrical properties of the corona in the various cascades. An important electrical parameter is the voltage distribution through the length of the electrodes. The voltage distribution in the channel 4 is 750 V per mm length. In the channel 5, it is 400 V per mm of length (spacing between the electrodes), i.e., the lower cascade has about twice as much energy as the upper cascade in the corona discharge. As a result, it is possible that the ozone production capacity in the lower cascade with the higher voltage is greater than in the upper cascade, but without a simultaneous corresponding decomposition of the ozone molecule occurring, obviously also caused by the slender arc.

The use of the apparatus described is indeed particularly intended for ozone production, but this does not exclude other possible uses. Thus, the apparatus may also be used for other electrochemical syntheses, e.g., for synthesizing ammonia according to the formula:

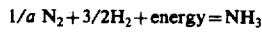

ing located therein a discharge electrode and an earthed electrode; providing at least one bipolar electrode between said electrodes to receive an electrical discharge from said discharge electrode and having a plurality of discharge points directed towards said earthed electrode; and applying a discharge potential to said discharge electrode.

2. A process as claimed in claim 1 said discharge potential being a D.C. potential 3. A process as claimed in claim 1, the gas comprising oxygen air.

4. Apparatus for producing ozone from a gas comprising oxygen, comprising a discharge chamber made from an electrically non-conductive material and having located therein a discharge electrode and an earthed electrode; means for passing a stream of gas through the discharge chamber between said electrodes; at least one bipolar electrode located between said electrodes and serving to divide the discharge chamber into at least two discharge channels, said at least one bipolar electrode having a surface adapted to receive an electrical discharge from said discharge electrode and a plurality of discharge points on an oppositely disposed surface thereof directed toward said earthed electrode; said discharge electrode having a plurality of discharge points directed toward said surface of the bipolar electrode adapted to receive an electrical discharge from said discharge electrode.

5. An apparatus as claimed in claim 1 wherein said discharge chamber is in the form of a tube.

6. An apparatus as claimed in claim 5 wherein said discharge electrode and said earthed electrode extend longitudinally inside said tube.

7. An apparatus as claimed in claim 6 wherein said discharge electrode and said earthed electrode extend substantially the entire length of said tube.

8. An apparatus as claimed in claim 5 wherein said at least one bipolar electrode extends longitudinally inside said tube.

9. An apparatus as claimed in claim 1 wherein said discharge chamber is in the form of a tube having a triangular transverse cross-section.

10. An apparatus as claimed in claim 9 wherein said discharge electrode is located in the angle formed by two of the walls of said chamber and said earthed electrode is located on the remaining wall of the chamber.

11. An apparatus as claimed in claim 10 wherein said discharge and earthed electrodes and said at least one

TABLE

| Parameters | Production of ozone | | | | | | | |
|---|---|---|---|---|---|---|---|---|
| | Vertical tube ozoniser | | Vertical plate ozoniser | | Apparatus described | | | |
| Gas supply | Air | | Air | | Air | | oxygen | |
| Minimum and maximum data | Minimum | maximum | minimum | maximum | minimum | maximum | minimum | maximum |
| Absolute pressure (atm) | 0.7 | 1 | 0.7 | 1 | 0.7 | 1.8 | 0.7 | 1.8 |
| Humidity of the air, dew point (° C) | −60 | −43 | −60 | −43 | −30 | +45 | −20 | +45 |
| Ozone volume conc. (mg $O_3$/l) | 15 | 20 | 15 | 20 | 7 | 38 | 11 | 55 |
| Ozone percent by weight (wt%) | 1.25 | 1.65 | 1.25 | 1.67 | 0.6 | 2.8 | 0.8 | 4.2 |
| Ozone production capacity (g $O_3$/KW/hr) | 56 | 62 | 49 | 55 | 80 | 140 | 150 | 250 |
| percent $O_3$ of theoretical unit (%) | 4.6 | 5.2 | 4.0 | 4.6 | 6.6 | 11.6 | 12.5 | 20.8 |

What is claimed is:

1. A process for producing ozone from a gas comprising oxygen which comprises passing a stream of gas comprising oxygen through a discharge chamber made from an electrically non-conductive material and havbipolar electrode extend longitudinally inside the tube and are arranged substantially parallel to each other.

12. An apparatus as claimed in claim 10 wherein a plurality of said discharge chambers are arranged radially around a central axis, said angles of the discharge chambers containing the discharge electrodes being located adjacent said central axis.

13. An apparatus as claimed in claim 12 wherein said discharge chambers are divided from each other by walls radially extending from said central axis, and said discharge electrode extending along said central axis and providing the discharge electrode for each discharge chamber.

14. An apparatus as claimed in claim 13 wherein the bipolar electrodes in the discharge chambers are arranged circumferentially around said central axis.

15. An apparatus as claimed in claim 1 wherein the walls of the discharge chamber are provided with grooves for fixing at least one of said discharge electrode, said earthed electrode and said at least one bipolar electrode.

16. An apparatus as claimed in claim 1 wherein said discharge chamber is in the form of a tube, said discharge and earthed electrodes and said at least one bipolar electrode extending longitudinally inside said tube but not the entire length of said tube.

17. An apparatus as claimed in claim 1 wherein said chamber is made of rigid PVC.

18. An apparatus as claimed in claim 1 wherein said surface of said at least one bipolar electrode is in the form of a grid.

19. An apparatus as claimed in claim 1 wherein said discharge points are in the form of saw teeth.

20. An apparatus as claimed in claim 1 wherein said discharge points of said at least one bipolar electrode are integral with said surface.

21. An apparatus as claimed in claim 1 wherein a plurality of said discharge chambers in the form of tubes are arranged in parallel in a housing provided with means for introducing streams of gas comprising oxygen into adjacent ends of the tubes, and means for removing ozone from the other ends of the tubes.

22. An apparatus as claimed in claim 1 wherein said discharge points are in the form of needle points.

* * * * *